Dec. 26, 1939. P. E. CLAWSON 2,184,632
CAN DISCHARGE SPOUT
Filed Jan. 13, 1939
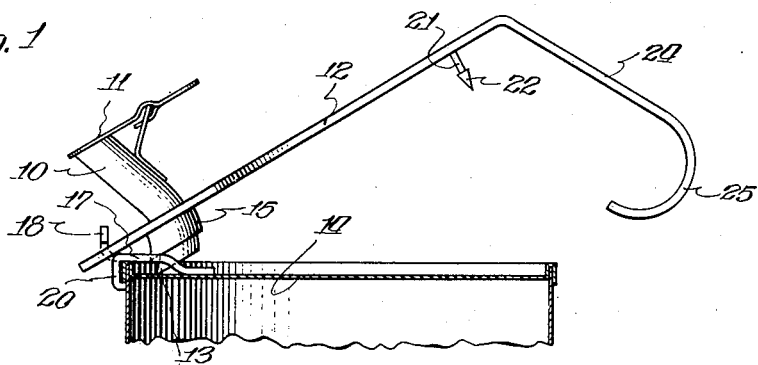
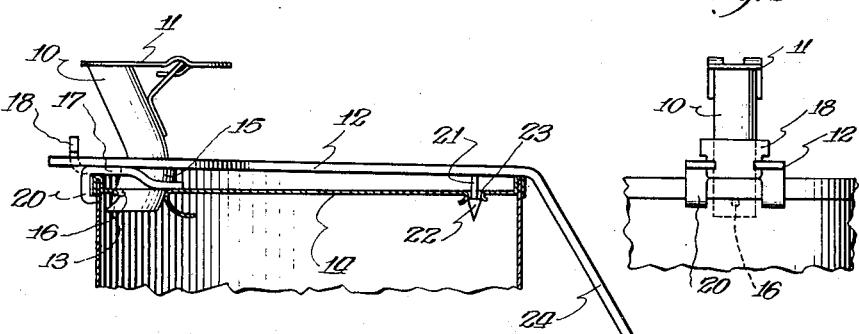
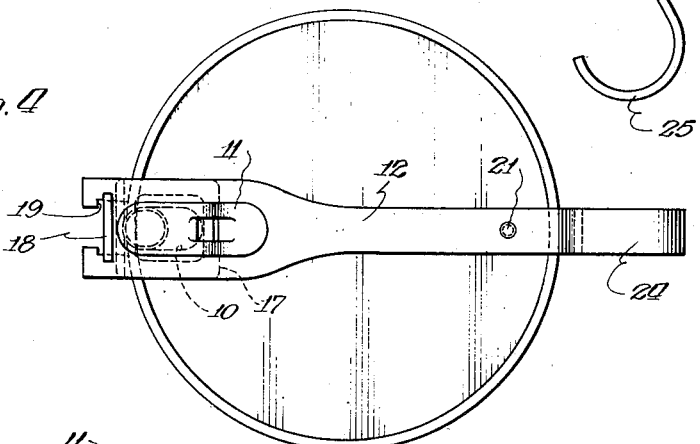
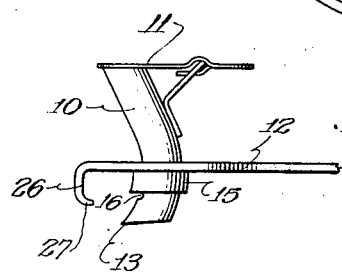
Inventor:
Philip E. Clawson.
By: Brayton Richards
Attorney.

Patented Dec. 26, 1939

2,184,632

UNITED STATES PATENT OFFICE 2,184,632

CAN DISCHARGE SPOUT

Philip E. Clawson, Oak Park, Ill., assignor of one-half to Maxwell M. Lappe, Oak Park, Ill.

Application January 13, 1939, Serial No. 250,677

1 Claim. (Cl. 221—23)

The invention relates to improvements in can discharge spouts and has for its primary object the provision of an improved discharge spout for cans which may be readily applied thereto, is capable of economical production and highly efficient in use.

Another object of the invention is the provision of a construction of the character indicated so arranged as to constitute a handle for manipulating the can to discharge the contents thereof through the spout.

Other objects will appear hereinafter.

The invention consists in the combinations and arrangements of parts hereinafter described and claimed.

The invention will be best understood by reference to the accompanying drawing forming a part of this specification and in which Fig. 1 is a side view of a construction embodying the invention and shown in the position assumed when first applied to a can;

Fig. 2 a similar view showing the construction in the position assumed after complete application to the can;

Fig. 3 an end view of the construction;

Fig. 4 a top plan view of the same; and

Fig. 5 a detail view showing a modified form of construction.

The embodiment of the invention illustrated in Figs. 1, 2, 3, and 4 of the drawing comprises a suitable discharge spout 10 provided at its top with a swinging cover or lid 11, said spout being rigidly secured to a handle lever 12 as indicated. At its lower end the spout is provided with a penetrating point 13 and the edges thereof are properly sharpened to facilitate the penetration of the top 14 of the can, as best indicated in Fig. 2. A rubber gasket 15 is arranged as shown to surround the lower end of the spout 10 beneath the lever 12 to seal the opening thus formed in the top of the can. A discharge opening or perforation 16 is arranged as shown in the lower end of the spout 10 just under the gasket 15 so as to facilitate the more complete discharge of a liquid from the can.

An attaching clip 17 is provided at its outer end with an upstanding T-head adapted and arranged to enter and engage a T-slot 19 in the end of the handle lever 12 and whereby a pivotal engagement is effected between said handle lever and said clip. At its lower outer edge, the attaching clip 17 is provided with a hook shoulder 20 adapted and arranged to engage the top edge of a can as indicated. By this arrangement the handle lever 12 may be readily attached to the can top by engaging the hook shoulder 20 under the top edge of the can as best shown in Fig. 1, and then forcing the lower end of the spout 10 to penetrate the can by pressing downwardly on the upper end of the said lever 12, as will be readily understood and as indicated in Fig. 2. The attaching clip 17 serves as a fulcrum for the handle lever 12 which affords a comparatively great range of movement for the handle lever, thus permitting the location of the spout 10 relatively close to the edge of the can so as to facilitate complete discharge of the contents of the can, and at the same time provides a long leverage for forcing the end of the spout 10 through the top of the can. As will be noted, the lower end of the spout 10 is outwardly curved on substantially the radii of movement of the lever 12, an arrangement which greatly facilitates the penetration of the can top and also tends to carry the lower end of the spout in close proximity to the can side.

The handle lever 12 is also provided with a stud 21 having an enlarged pointed penetrating head 22 adapted and arranged to be forced through the top of a can as shown in Fig. 2. When the head 22 is thus forced downwardly through the top of the can, it forms an air opening 23 and at the same time the enlarged head 22 engages and interlocks with the edges of said opening to attach the handle lever to the can. The air opening 23 admits air to the can to facilitate the discharge of the liquid contents thereof through the spout 10, as will be readily understood. The end of the lever 12 is bent downwardly to form a handle 24 having a hook 25 at its end for ready engagement by the hand. By this arrangement a handle is provided for manipulating the can to discharge the contents thereof through the spout 10 and at the same time provision made for the entry of air to facilitate the discharge of the contents of the can. As will be noted, the lower end of the spout 10 is curved outwardly and the presence of the attaching clip 17 permits of the arrangement of the end of the spout close to the end of the lever so that its discharge end will rest close to the side of the can thus facilitating complete discharge of the contents of the can. The opening 16 also facilitates such complete discharge, as will be readily understood.

In the modification illustrated in Fig. 5, the attaching clip 17 is dispensed with and the end of the lever 12 is bent downwardly at 26 and provided with a hook shoulder 27 for engagement under the edge of the top of the can. Otherwise the construction and arrangement is identical with that already described. By this arrangement a somewhat simpler and therefore a construction capable of more economical manufacture is provided, but it is to be noted that the penetrating point of the spout cannot thus be located so close to the effective end of the lever and the complete discharge of the contents of the can accomplished.

While I have illustrated and described the preferred forms of construction for carrying the invention into effect, this is capable of variation and modification without departing from the spirit of the invention. I therefore do not wish to be limited to the precise details disclosed, but desire to avail myself of such variations and modifications as fall within the scope of the appended claim.

I claim:

A device of the class described comprising a handle lever adapted and arranged to extend diametrically across the top of a can and provided at one end with a handle extending downwardly in cooperative relation with the adjacent side of the can; a clip having a hook engaging under the top edge of the can and pivotally connected with the other end of said handle lever to serve as a fulcrum therefor; a discharge spout on said lever adjacent said clip and having its lower end outwardly curved and adapted and arranged to penetrate the can top; and a penetrating stud adjacent the handle end of said lever having an enlarged pointed head adapted and arranged to penetrate and engage the can top.

PHILIP E. CLAWSON.